(12) United States Patent
Kurosaki et al.

(10) Patent No.: US 10,041,175 B2
(45) Date of Patent: Aug. 7, 2018

(54) PLATED STEEL SHEET

(71) Applicant: NIPPON STEEL & SUMITOMO METAL CORPORATION, Tokyo (JP)

(72) Inventors: Masao Kurosaki, Tokyo (JP); Shinichi Yamaguchi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/127,821

(22) PCT Filed: Apr. 8, 2015

(86) PCT No.: PCT/JP2015/060961
§ 371 (c)(1),
(2) Date: Sep. 21, 2016

(87) PCT Pub. No.: WO2015/156313
PCT Pub. Date: Oct. 15, 2015

(65) Prior Publication Data
US 2017/0107625 A1    Apr. 20, 2017

(30) Foreign Application Priority Data

Apr. 8, 2014  (JP) .................................. 2014-079601

(51) Int. Cl.
*C23C 22/44* (2006.01)
*C23C 22/36* (2006.01)
(Continued)

(52) U.S. Cl.
CPC ............. *C23C 22/44* (2013.01); *B32B 15/012* (2013.01); *B32B 15/013* (2013.01);
(Continued)

(58) Field of Classification Search
CPC ......... C23C 22/44; C23C 22/42; C23C 22/40; C23C 22/36; C23C 2222/20; C23C 22/07;
(Continued)

(56) References Cited

U.S. PATENT DOCUMENTS 6,143,422 A    11/2000  Nagai et al.
6,878,462 B1    4/2005  Umino et al.
2003/0064241 A1    4/2003  Suzuki et al.

FOREIGN PATENT DOCUMENTS

CN    1338988 A    3/2002
EP    0 510 224 A1    10/1992
(Continued)

OTHER PUBLICATIONS

Translation, Nakamori et al., JP 60-128286, Jul. 1985.*
(Continued)

*Primary Examiner* — Michael E. La Villa
(74) *Attorney, Agent, or Firm* — Birch, Stewart, Kolasch & Birch, LLP

(57) ABSTRACT

A plated steel sheet (1) includes: a steel sheet (2); a pre-plating layer (3) on at least one surface of the steel sheet (2), the pre-plating layer (3) containing Al, Cu, In, Zn, Sn, or Sb, or any combination thereof; and a plating layer (4) of a Zn—Ni alloy on the pre-plating layer (3), a Ni content of the Zn—Ni alloy being 5 mass % to 15 mass %. A coating weight of the pre-plating layer (3) is 0.5 g/m² or more, and a coating weight of the plating layer (4) is 5 g/m² or more.

5 Claims, 3 Drawing Sheets

(51) Int. Cl.
| | |
|---|---|
| *C22C 18/00* | (2006.01) |
| *C22C 9/06* | (2006.01) |
| *C22C 13/00* | (2006.01) |
| *C22C 12/00* | (2006.01) |
| *C22C 28/00* | (2006.01) |
| *B32B 15/01* | (2006.01) |
| *C25D 3/22* | (2006.01) |
| *C25D 3/30* | (2006.01) |
| *C25D 3/54* | (2006.01) |
| *C25D 3/38* | (2006.01) |
| *C25D 3/12* | (2006.01) |
| *C25D 3/04* | (2006.01) |
| *C25D 3/56* | (2006.01) |
| *C25D 3/60* | (2006.01) |
| *C23C 28/02* | (2006.01) |
| *C23C 30/00* | (2006.01) |
| *C23C 28/00* | (2006.01) |

(52) U.S. Cl.
CPC ............. *B32B 15/015* (2013.01); *C22C 9/06* (2013.01); *C22C 12/00* (2013.01); *C22C 13/00* (2013.01); *C22C 18/00* (2013.01); *C22C 28/00* (2013.01); *C23C 22/36* (2013.01); *C23C 28/02* (2013.01); *C23C 28/021* (2013.01); *C23C 28/023* (2013.01); *C23C 28/025* (2013.01); *C23C 28/30* (2013.01); *C23C 28/321* (2013.01); *C23C 28/34* (2013.01); *C23C 30/00* (2013.01); *C23C 30/005* (2013.01); *C25D 3/04* (2013.01); *C25D 3/12* (2013.01); *C25D 3/22* (2013.01); *C25D 3/30* (2013.01); *C25D 3/38* (2013.01); *C25D 3/54* (2013.01); *C25D 3/565* (2013.01); *C25D 3/60* (2013.01); *C23C 2222/20* (2013.01); *Y10T 428/12681* (2015.01); *Y10T 428/12722* (2015.01); *Y10T 428/12757* (2015.01); *Y10T 428/12799* (2015.01); *Y10T 428/12806* (2015.01); *Y10T 428/12819* (2015.01); *Y10T 428/12917* (2015.01); *Y10T 428/12937* (2015.01); *Y10T 428/12951* (2015.01); *Y10T 428/12972* (2015.01); *Y10T 428/12979* (2015.01); *Y10T 428/2495* (2015.01); *Y10T 428/24942* (2015.01); *Y10T 428/24967* (2015.01); *Y10T 428/24975* (2015.01); *Y10T 428/263* (2015.01); *Y10T 428/264* (2015.01); *Y10T 428/265* (2015.01); *Y10T 428/27* (2015.01); *Y10T 428/31678* (2015.04)

(58) Field of Classification Search
CPC ....... C23C 22/34; C23C 22/361; C23C 22/80; C23C 28/02; C23C 28/021; C23C 28/023; C23C 28/025; C23C 28/30; C23C 28/321; C23C 28/34; C23C 30/00; C23C 30/005; C22C 28/00; C22C 18/00; C22C 13/00; C22C 12/00; C22C 9/06; B32B 15/015; B32B 15/012; B32B 15/013; B32B 15/04; B32B 15/043; B32B 15/18; Y10T 428/12799; Y10T 428/12917; Y10T 428/12951; Y10T 428/12972; Y10T 428/12979; Y10T 428/12757; Y10T 428/12681; Y10T 428/12722; Y10T 428/12819; Y10T 428/12806; Y10T 428/12937; Y10T 428/2495; Y10T 428/24967; Y10T 428/24975; Y10T 428/24942; Y10T 428/263; Y10T 428/264; Y10T 428/265; Y10T 428/27; Y10T 428/31678

See application file for complete search history.

(56) References Cited

FOREIGN PATENT DOCUMENTS

| | | |
|---|---|---|
| JP | 56-35790 A | 4/1981 |
| JP | 58-45396 A | 3/1983 |
| JP | 59-116392 A | 7/1984 |
| JP | 59-162292 A | 9/1984 |
| JP | 60-128286 A | 7/1985 |
| JP | 61-6295 A | 1/1986 |
| JP | 61-6296 A | 1/1986 |
| JP | 61-210198 A | 9/1986 |
| JP | 61-257494 A | 11/1986 |
| JP | 62-250196 A | 10/1987 |
| JP | 3-158495 A | 7/1991 |
| JP | 4-116192 A | 4/1992 |
| JP | 5-9750 A | 1/1993 |
| JP | 7-54195 A | 2/1995 |
| JP | 9-241866 A | 9/1997 |
| JP | 2001-341228 A | 12/2001 |
| JP | 2004-360019 A | 12/2004 |
| JP | 3859941 B2 | 12/2006 |
| JP | 2011-26669 A | 2/2011 |
| JP | 2011-106029 A | 6/2011 |
| JP | 2011-252184 A | 12/2011 |
| JP | 2012-237065 A | 12/2012 |
| WO | WO 97/46733 A1 | 12/1997 |

OTHER PUBLICATIONS

International Search Report for PCT/JP2015/060961 dated Jul. 14, 2015.

Written Opinion of the International Searching Authority for PCT/JP2015/060961 (PCT/ISA/237) dated Jul. 14, 2015.

Translation of the International Preliminary Report on Patentability and Written Opinion of the International Searching Authority (Forms PCT/IB/338,PCT/IB/373 and PCT/ISA/237), dated Oct. 20, 2016 for International Application No. PCT/JP2015/060961.

* cited by examiner

PLATED STEEL SHEET

TECHNICAL FIELD

The present invention relates to a plated steel sheet provided with a Zn—Ni alloy plating layer.

BACKGROUND ART

A steel sheet used for fuel tanks of an automobile, a motorcycle, and so on is required to have corrosion resistance to fuel such as gasoline on a surface thereof. A Sn—Pb based plated steel sheet has been broadly used as the steel sheet for fuel tanks. In recent years, due to a restriction on Pb, a plated steel sheet as an alternative to the Sn—Pb based plated steel sheet has been developed (Patent Literatures 1 to 4).

A Zn—Ni based plated steel sheet, which is one alternative material to the Sn—Pb based plated steel sheet, has the advantage of exhibiting good corrosion resistance to gasoline at low cost, and in recent years, the use of the Zn—Ni based plated steel sheet in emerging countries has been increasing.

However, fuel tanks manufactured by using the Zn—Ni based plated steel sheet sometimes cannot obtain sufficient corrosion resistance to fuel. The corrosion resistance to a fuel containing alcohol in particular is liable to be insufficient, and thus a hole is sometimes formed for a short period of time.

A corrosion-resistant member for biofuel containing alcohol is described in Patent Literature 5. However, even when a fuel tank is manufactured by using the materials described in Patent Literature 5 to a reproducible extent, sufficient corrosion resistance cannot be obtained.

CITATION LIST

Patent Literature

Patent Literature 1: Japanese Laid-open Patent Publication No. 09-241866
Patent Literature 2: Japanese Laid-open Patent Publication No. 2001-341228
Patent Literature 3: Japanese Patent No. 3859941
Patent Literature 4: Japanese Laid-open Patent Publication No. 2004-360019
Patent Literature 5: Japanese Laid-open Patent Publication No. 2011-026669

SUMMARY OF INVENTION

Technical Problem

An object of the present invention is to provide a plated steel sheet capable of obtaining excellent corrosion resistance to various fuels.

Solution to Problem

As a result of earnest examination conducted for the purpose of solving the above-described object, the present inventors have found out that a crack occurs in a plating layer in working a plated steel sheet into a fuel tank, and excellent corrosion resistance can be obtained even when a crack occurs in a plating layer by providing a specific pre-plating layer between the plating layer and a steel sheet, though details will be described later.

The present invention has been made based on the above-described findings, and the gist thereof is as follows.

(1) A plated steel sheet, includes:
a steel sheet;
a pre-plating layer on at least one surface of the steel sheet, the pre-plating layer containing Al, Cu, In, Zn, Sn, or Sb, or any combination thereof; and
a plating layer of a Zn—Ni alloy on the pre-plating layer, a Ni content of the Zn—Ni alloy being 5 mass % to 15 mass %, wherein a coating weight of the pre-plating layer is 0.5 g/m$^2$ or more, and
a coating weight of the plating layer is 5 g/m$^2$ or more.

(2) The plated steel sheet according to (1), further comprising a chromate-free film of 10 mg/m$^2$ or more on the plating layer.

(3) The plated steel sheet according to (2), wherein the chromate-free film contains a fluoro compound of hexafluorotitanic acid or hexafluorozirconic acid or both of them, phosphoric acid, and a vanadium compound.

(4) The plated steel sheet according to (2), wherein the chromate-free film is formed by using a treatment solution containing a salt of Zr or Ti or both of them, or a treatment solution containing a silane coupling agent.

(5) The plated steel sheet according to (4), wherein the treatment solution containing the silane coupling agent contains a first silane coupling agent containing a single amino group in a molecule and a second silane coupling agent containing a single glycidyl group in a molecule.

Advantageous Effects of Invention

According to the present invention, an appropriate pre-plating layer is included, so that excellent corrosion resistance can be obtained to various fuels such as gasoline and a composite fuel.

DESCRIPTION OF EMBODIMENTS

First, there will be explained a process leading to achievement of the present invention led by the present inventors. In the present invention, a Zn—Ni alloy is a binary alloy substantially composed of Zn and Ni and may contain impurities therein, but does not contain other elements added intentionally.

(First Experiment)

The present inventors conducted an experiment (first experiment) for confirming an appearance of damage of a plating layer caused by working in a conventional Zn—Ni based plated steel sheet. In the first experiment, a B-containing ultralow carbon Ti steel sheet was prepared as a base steel sheet, and a plating layer of a Zn—Ni alloy with a Ni content being 12 mass % was formed on both surfaces thereof. A plating solution is used for formation of the plating layer. The plating solution was obtained in a manner that an aqueous solution containing zinc sulfate: 180 g/L, nickel sulfate: 200 g/L, and sodium sulfate: 100 g/L was prepared, and pH of the aqueous solution was adjusted to 1.2 with sulfuric acid. A coating weight of the plating layer was 30 g/m$^2$ per one surface. Then, a film was formed on surfaces of the plating layers so as to have a coating weight of 500 mg/m$^2$ per one surface with use of a treatment solution containing a silane coupling agent. In this manner, a plated steel sheet was manufactured. Thereafter, a sample was cut out from the plated steel sheet, a cylindrical cup having a 100 mm diameter was formed of the sample with a drawing ratio of 2.2, and the appearance of the plating layer on the vertical wall of the cylindrical cup was observed.

Figure 1:
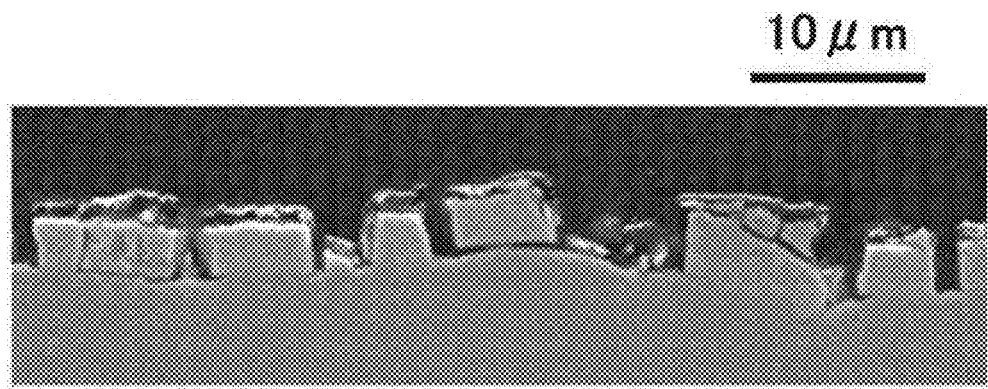
FIG. 1 is a view illustrating an appearance of a plating layer on a vertical wall of a cylindrical cup.

FIG. 1 illustrates the appearance of the plating layer on the vertical wall. As illustrated in FIG. 1, many cracks occurred in the plating layer and the base steel sheet was exposed at many places. The reason why many cracks occurred was because the Zn—Ni alloy plating layer is formed of an intermetallic compound represented as Ni$_5$Zn$_{21}$ and is poor in ductility.

(Second Experiment)

Next, the present inventors conducted an experiment (second experiment) for confirming corrosion resistance of the Zn—Ni based plated steel sheet after forming. In the second experiment, another sample was cut out from a different portion of the plated steel sheet manufactured in the first experiment, and another cylindrical cup having a 100 mm diameter was formed of the sample with a drawing ratio of 2.2. A composite fuel containing gasoline:ethanol:water=69:29:2 by volume ratio was prepared, and 100 mg of acetic acid and 100 mg of NaCl per 1 L of the composite fuel were added to the composite fuel, to produce a corrosive solution. Then, 100 mL of the corrosive solution was put into the cylindrical cup to be sealed, the cylindrical cup with the corrosive solution enclosed therein was left to stand at 45° C., and the appearance of the inner surface of the cylindrical cup was observed after 1000 hours elapsed.

Figure 2:
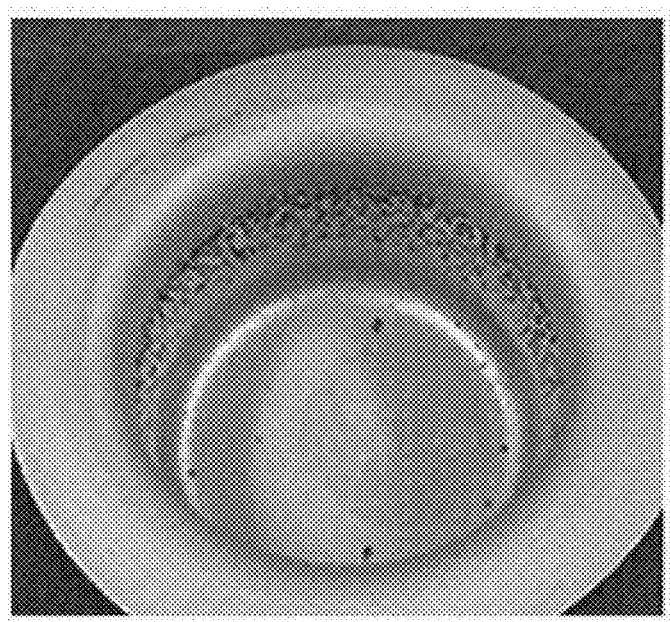
FIG. 2 is a view illustrating an appearance of an inner surface of the cylindrical cup.

FIG. 2 illustrates the appearance of the inner surface of the cylindrical cup. As illustrated in FIG. 2, corrosion occurred significantly and a large amount of pitting was generated on the vertical wall where many cracks occurred in the plating layer. The depth of pitting was 100 μm or more.

Through a series of these experiments, it was confirmed that cracks are likely to occur in the Zn—Ni alloy plating layer and corrosion progresses at each of crack occurring places. Only the formation of a chromate film fails to prevent such cracks, and even the method described in Patent Literature 1, for example, fails to obtain sufficient corrosion resistance.

As a result that the present inventors further conducted earnest examination repeatedly in order to study the reason of such a phenomenon, it was revealed that an oxygen reduction reaction (cathode reaction) being part of corrosion reaction progresses quickly on the surface of the base steel sheet exposed from the crack, and as a result, a dissolution reaction (anode reaction) of the Zn—Ni alloy plating layer, which is a paired reaction, is promoted. It was also revealed that these reactions are significant when alcohol is contained in a fuel in particular.

Then, as a result that the present inventors further conducted earnest examination based on these findings, it was found out that providing a specific pre-plating layer between a steel sheet and a plating layer makes it possible to effectively suppress corrosion of the Zn—Ni based plated steel sheet.

Next, there will be explained the pre-plating layer.

(Third Experiment)

The present inventors conducted an experiment (third experiment) for specifying materials capable of being used for the pre-plating layer. In the third experiment, first, similarly to the first experiment, B-containing ultralow carbon Ti steel sheets were prepared as a base steel sheet, and a pre-plating layer of each of Al, Ag, Co, Cr, Cu, In, Mn, Ni, Zn, Sn, Sb, and Pt was formed on both surfaces of each of them. Each coating weight of the pre-plating layers was 1 g/m$^2$. In formation of the pre-plating layers, electroplating of each of the steel sheets was performed in a solution containing Al, Ag, Co, Cr, Cu, In, Mn, Ni, Zn, Sn, Sb, or Pt as sulfate, chloride salt, nitrate, formate, or acetate. An organic solvent (dimethyl sulfone) bath was used when the pre-plating layer of Al was formed, and a bath using water as a solvent was used when the pre-plating layers of the other metals were formed. Then, a plating layer of a Zn—Ni alloy containing Ni: 12 mass % and Zn: 88 mass % was formed on each of the pre-plating layers. The coating weight of the plating layer was 30 g/m$^2$ per one surface. In this manner, plated steel sheets were manufactured. Thereafter, similarly to the second experiment, cylindrical cups and a corrosive solution were prepared, and corrosion resistance evaluations were performed with use of these. For comparison, the corrosion resistance evaluation was performed also for a plated steel sheet not having had pre-plating layers formed thereon but having had Zn—Ni alloy plating layers formed thereon. These results are listed in Table 1. In Table 1, ○ indicates no corrosion, Δ indicates that corrosion having a depth of 20 μm or less existed, and x indicates that corrosion having a depth of greater than 20 μm existed.

TABLE 1

| METAL | CORROSION RESISTANCE |
|---|---|
| Al | ○ |
| Ag | Δ |
| Co | Δ |
| Cr | Δ |
| Cu | ○ |
| In | ○ |
| Mn | Δ |
| Ni | Δ |
| Zn | ○ |
| Sn | ○ |
| Sb | ○ |
| Pt | X |
| None | Δ |

As listed in Table 1, when the pre-plating layers of Al, Cu, In, Zn, Sn, and Sb were formed, more excellent corrosion resistance than in the case of no pre-plating layer being formed was obtained.

(Forth Experiment and Fifth Experiment)

Further, the present inventors conducted an experiment related to the oxygen reduction reaction and an experiment related to the appearance of the plating layer after working for clarifying characteristics of the above-described metals suitable for the pre-plating layer.

In the experiment related to the oxygen reduction reaction (fourth experiment), first, similarly to the first experiment, B-containing ultralow carbon Ti steel sheets were prepared as a base steel sheet, and a pre-plating layer of each of Al, Ag, Co, Cr, Cu, Fe, In, Mn, Ni, Zn, Sn, Sb, and Pt was formed on both surfaces of each of them. Each coating weight of the pre-plating layers was 1 $g/m^2$. Then, an oxygen reduction current was measured with a potential of −600 mV (Ag/AgCl electrode reference) with use of an aqueous solution obtained by dissolving 50 g/L of $Na_2SO_4$ and performing air bubbling for 30 minutes or more to saturate dissolved oxygen. The potential of −600 mV (Ag/AgCl electrode reference) corresponds to a corrosion potential of the Zn—Ni alloy containing Ni: 12 mass % and Zn: 88 mass %. These results are listed in Table 2. In Table 2, ○ indicates that the oxygen reduction current was smaller by one digit or more than in the case of using Fe for the pre-plating layer, x indicates that it was larger by one digit or more, and Δ indicates that it was between these.

In the experiment related to the appearance of the plating layer after working (fifth experiment), first, similarly to the fourth experiment, a pre-plating layer was formed on both surfaces of each of base steel sheets. Then, a sample was cut out from each of the base steel sheets each having had the pre-plating layers formed thereon, and a cylindrical cup having a 100 mm diameter was formed of each of the samples with a drawing ratio of 2.2. Then, each area ratio of the pre-plating layers remaining on vertical walls of the cylindrical cups was measured. These results are listed in Table 2. In Table 2, ○ indicates that the area ratio of the remaining pre-plating layer was 95% or more, Δ indicates that it was 90% or more and less than 95%, and x indicates that it was less than 90%.

TABLE 2

| METAL | OXYGEN REDUCTION CURRENT | AREA RATIO |
|---|---|---|
| Al | ○ | ○ |
| Ag | Δ | ○ |
| Co | Δ | X |
| Cr | Δ | X |
| Cu | ○ | ○ |
| Fe | Δ | ○ |
| In | ○ | ○ |
| Mn | Δ | X |
| Ni | Δ | X |
| Zn | ○ | ○ |
| Sn | ○ | ○ |
| Sb | ○ | ○ |
| Pt | X | ○ |

As listed in Table 2, the oxygen reduction current of the metals (○ in Table 1) that were each used for the pre-plating layer to achieve an improvement in corrosion resistance, which was revealed by the third experiment, was smaller by one digit or more than that of Fe, and the area ratio of the pre-plating layers remaining after working was 95% or more.

(Sixth Experiment)

The present inventors conducted an experiment related to the coating weight necessary for the pre-plating layer (sixth experiment). In the sixth experiment, first, similarly to the fifth experiment, a pre-plating layer was formed on both surfaces of each of base steel sheets. Al, Cu, In, Zn, Sn, and Sb, each of which improved corrosion resistance, were used as the element, and each coating weight was changed in a range of 0 $g/m^2$ to 1.0 $g/m^2$. Then, a sample was cut out from each of the base steel sheets each having had the pre-plating layers formed thereon and a cylindrical cup having a 100 mm diameter was formed of each of the samples with a drawing ratio of 2.2. Then, each area ratio of the pre-plating layers remaining on vertical walls of the cylindrical cups was measured. Results related to Al are listed in Table 3. In Table 3, ○ indicates that the area ratio of the remaining pre-plating layer was 95% or more, Δ indicates that it was 90% or more and less than 95%, and x indicates that it was less than 90%. Further, with regard also to Cu, In, Zn, Sn, and Sb, the similar results were obtained.

TABLE 3

| COATING WEIGHT ($g/m^2$) | AREA RATIO |
|---|---|
| 0.1 | X |
| 0.2 | X |
| 0.3 | X |
| 0.4 | Δ |
| 0.5 | ○ |
| 0.6 | ○ |
| 0.7 | ○ |
| 0.8 | ○ |
| 0.9 | ○ |
| 1.0 | ○ |

As listed in Table 3, it was revealed that the coating weight needs to be 0.5 $g/m^2$ or more in order that the pre-plating layer should remain after working in an area ratio of 95% or more.

These experiments revealed that the state of the base steel sheet being coated with the pre-plating layer is maintained and exposure of the base steel sheet from cracks is suppressed even if cracks occur in the Zn—Ni alloy plating layer by working, by providing the pre-plating layer of Al, Cu, In, Zn, Sn, or Sb, and that, due to the exposure suppression, progress of the oxygen reduction reaction (cathode reaction) slows down and the dissolution reaction of the plating layer (anode reaction) is suppressed.

Figure 3:
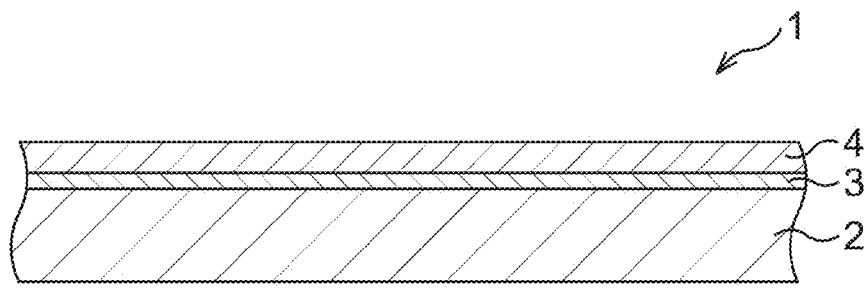
FIG. 3 is a cross-sectional view illustrating a structure of a plated steel sheet according to an embodiment of the present invention.

Next, there will be explained an embodiment of the present invention. FIG. 3 is a cross-sectional view illustrating a plated steel sheet according to the embodiment of the present invention.

As illustrated in FIG. 3, a plated steel sheet 1 according to the embodiment includes a steel sheet (base steel sheet) 2, a pre-plating layer 3 on one surface of the steel sheet 2, and a plating layer 4 on the pre-plating layer 3. The pre-plating layer 3 contains Al, Cu, In, Zn, Sn, or Sb, or any combination thereof, and a coating weight of the pre-plating layer 3 is 0.5 $g/m^2$ or more. The plating layer 4 is made of a Zn—Ni alloy containing Ni: 5 mass % to 15 mass % and Zn: 85 mass % to 95 mass %, and a coating weight of the plating layer 4 is 5 $g/m^2$ or more.

The steel type and the composition of the steel sheet 2 are not limited. For example, a normally used ultralow carbon steel such as an IF (interstitial free) steel, an ultralow carbon Ti steel containing Ti and a small amount of Nb, and an ultralow carbon Ti—Nb steel may be used for the steel sheet 2. A steel containing a strengthening element such as Si, Mn, P, and a steel containing B as a grain boundary strengthening element may also be used for the steel sheet 2. A steel containing Cr such as a stainless steel may also be used for the steel sheet 2. The steel containing Cr is suitable when the plated steel sheet 1 is used under a condition where rust is likely to occur on an end surface such as outdoors.

As described above, the pre-plating layer 3 contains Al, Cu, In, Zn, Sn, or Sb, or any combination thereof. That is, the pre-plating layer 3 may contain Al, Cu, In, Zn, Sn, or Sb alone, or may also contain two or more of these elements. The pre-plating layer 3 may also contain metals such as Cr, Mo, Nb, and Fe. However, when the total amount of the metals such as Cr, Mo, Nb, and Fe is greater than 10 mass %, the pre-plating layer 3 is brittle and is likely to peel off during working. For example, when the total amount of the metals is greater than 10 mass % and the same experiment as the fifth experiment is conducted, the area ratio of the remaining pre-plating layer is likely to decrease. Thus, the total amount of the metal other than Al, Cu, In, Zn, Sn, and Sb is preferable to be 10 mass % or less. The method of forming the pre-plating layer 3 is not limited, and an electrolytic treatment method is preferable. This is because the electrolytic treatment method is the most excellent in uniformity and exhibits a corrosion resistance improving effect most effectively under the present situation. Salt of the above-described six kinds of metals contained in an electrolytic treatment solution is not limited and, for example, sulfate, chloride salt, nitrate, formate, or acetate may be used.

The coating weight of the pre-plating layer 3 is 0.5 $g/m^2$ or more. When the coating weight of the pre-plating layer 3 is less than 0.5 $g/m^2$, a region where sufficient corrosion resistance is not obtained is possibly made on the plated steel sheet. For the purpose of obtaining more excellent corrosion resistance, the coating weight of the pre-plating layer 3 is preferable to be 0.8 $g/m^2$ or more. The upper limit of the coating weight of the pre-plating layer 3 is not limited, and the effect of the coating weight of the pre-plating layer 3 is saturated if the coating weight is about 5.0 $g/m^2$, and the pre-plating layer 3 is likely to peel off if the coating weight is greater than 100.0 $g/m^2$. Thus, the coating weight of the pre-plating layer 3 is preferable to be 100.0 $g/m^2$ or less from a viewpoint of suppression of peeling, and is preferable to be 5.0 $g/m^2$ or less from an economic viewpoint.

The Ni content of the Zn—Ni alloy for the plating layer 4 is 5 mass % to 15 mass %. When the Ni content is less than 5 mass %, the Zn content results in being greater than 95 mass %, and sufficient corrosion resistance to degraded gasoline cannot be obtained, red rust occurs early, and pitting occurs, similarly to normal Zn plating. Thus, the Ni content is 5 mass % or more. For the purpose of obtaining more excellent corrosion resistance to degraded gasoline, the Ni content is preferable to be 7 mass % or more. On the other hand, when the content ratio of Ni is greater than 15 mass %, the plating layer 4 hardens too much, thereby causing peeling during working, resulting in that sufficient corrosion resistance cannot be obtained. Thus, the Ni content is 15 mass % or less. For the purpose of more suppressing the peeling during working, the Ni content is preferable to be 13 mass % or less.

The coating weight of the plating layer 4 is 5 $g/m^2$ or more. When the coating weight of the plating layer 4 is less than 5 $g/m^2$, sufficient corrosion resistance cannot be obtained to both degraded gasoline and a composite fuel of gasoline and alcohol. For the purpose of obtaining more excellent corrosion resistance, the coating weight of the plating layer 4 is preferable to be 10 $g/m^2$ or more. The upper limit of the coating weight of the plating layer 4 is not limited, and the effect of the coating weight of the plating layer 4 is saturated when the coating weight is about 60 $g/m^2$, and the plating layer 4 is likely to peel off when the coating weight is greater than 100 $g/m^2$. Thus, the coating weight of the plating layer 4 is preferable to be 100 $g/m^2$ or less from a viewpoint of suppression of peeling, and is preferable to be 60 $g/m^2$ or less from an economic viewpoint.

The plated steel sheet 1 exhibits excellent corrosion resistance to gasoline and a composite fuel of gasoline and alcohol in a fuel tank formed so as to make the pre-plating layer 3 and the plating layer 4 inside.

Figure 4:
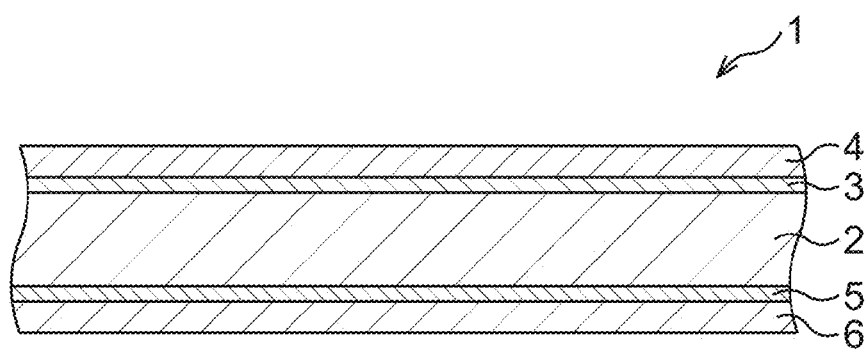
FIG. 4 is a cross-sectional view illustrating a structure of a plated steel sheet according to a modified example of the embodiment.
Figure 5:
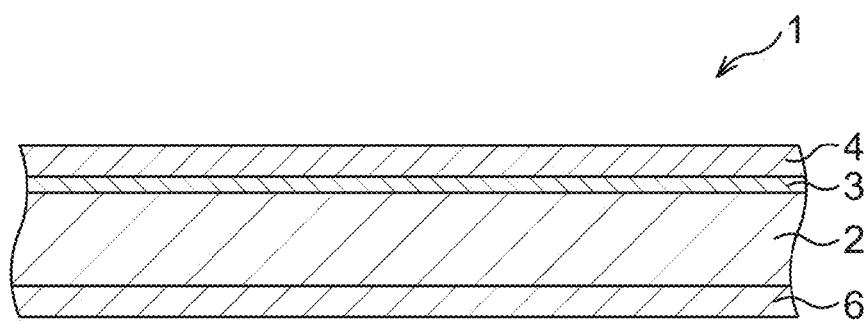
FIG. 5 is a cross-sectional view illustrating a structure of a plated steel sheet according to another modified example of the embodiment.
Figure 6:
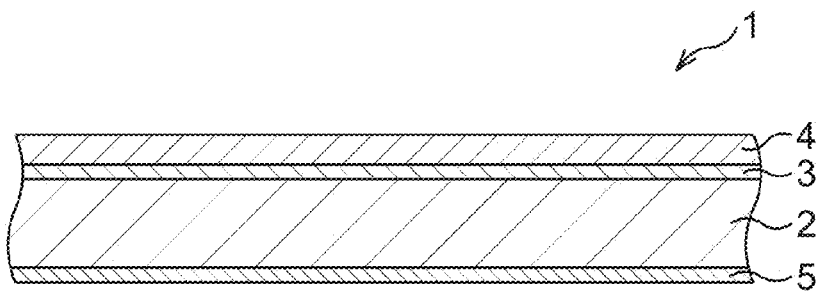
FIG. 6 is a cross-sectional view illustrating a structure of a plated steel sheet according to another modified example of the embodiment.

As illustrated in FIG. 4, the plated steel sheet 1 may include a pre-plating layer 5 and a plating layer 6 on the pre-plating layer 5 on the other surface of the steel sheet 2. If the pre-plating layer 5 is provided with the same constitution as that of the pre-plating layer 3 and the plating layer 6 is provided with the same constitution as that of the plating layer 4, excellent corrosion resistance is exhibited also in a fuel tank formed so as to make the pre-plating layer 5 and the plating layer 6 inside. As illustrated in FIG. 5, the plating layer 6 may be formed without the pre-plating layer 5. As illustrated in FIG. 6, the pre-plating layer 5 may be formed without the plating layer 6. In the example illustrated in FIG. 5 or FIG. 6, the plated steel sheet 1 exhibits excellent corrosion resistance in a fuel tank formed so as to make the pre-plating layer 3 and the plating layer 4 inside.

Figure 7:
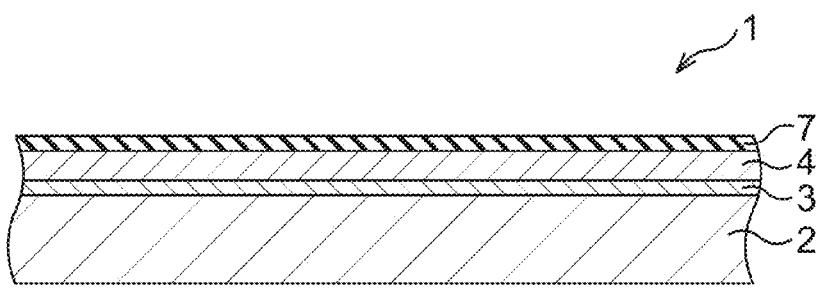
FIG. 7 is a cross-sectional view illustrating a structure of a plated steel sheet according to another modified example of the embodiment.

As illustrated in FIG. 7, the plated steel sheet 1 illustrated in FIG. 3 may include a chromate-free film 7 on the plating layer 4. The chromate-free film 7 contributes to a rust prevention effect. When the coating weight of the chromate-free film 7 is less than 10 $mg/m^2$, a sufficient rust prevention effect is not be obtained. Thus, the coating weight of the chromate-free film 7 is preferable to be 10 $mg/m^2$ or more, and is more preferable to be 15 $mg/m^2$ or more for the purpose of obtaining a more excellent rust prevention effect. On the other hand, the rust prevention effect of the chromate-free film 7 is saturated when the coating weight is about 1000 $mg/m^2$. Thus, the coating weight of the chromate-free film 7 is, from an economic viewpoint, preferable to be 1000 $mg/m^2$ or less, and more preferable to be 900 $mg/m^2$ or less.

The chromate-free film 7 can be formed by a chromate-free treatment (non-chromate treatment). As a treatment solution to be used for the chromate-free treatment, a treatment solution not containing hexavalent chrome, which is harmful environmentally, for example, a treatment solution containing a salt of Zr or Ti or both of them, a treatment solution containing a silane coupling agent are exemplified. The chromate-free film (conversion treatment film) 7 containing 5 mass % or more of Ti, Zr, P, Ce, Si, Al, Li, or the like as a main component and not containing chrome canbe formed on the plating layer 4 by the chromate-free treatment using the treatment solution. That is, the chromate-free film 7 contains, for example, Ti, Zr, P, Ce, Si, Al, or Li, or any combination thereof.

The treatment solution containing a silane coupling agent is especially effective For formation of the chromate-free film 7. For example, it is preferable that a treatment solution containing a first silane coupling agent containing a single amino group in a molecule, a second silane coupling agent containing a single glycidyl group in a molecule, a fluoro compound of hexafluorotitanic acid or hexafluorozirconic acid, or both of them, phosphoric acid, and a vanadium compound is used. A composite film containing a fluoro compound of hexafluorotitanic acid or hexafluorozirconic acid or both of them, phosphoric acid, and a vanadium compound can be formed as the chromate-free film 7 by using the treatment solution.

As for a compounding ratio of the above-described treatment solution, the following four relations are preferably satisfied where "A" denotes a solid content mass of the first silane coupling agent, "B" denotes a solid content mass of the second silane coupling agent, "X" denotes a solid content mass of the fluoro compound, "Y" denotes a solid content mass of the phosphoric acid, and "Z" denotes a solid content mass of the vanadium compound.

$$0.5 \le A/B \le 1.7$$

$$0.02 \le X/(A+B) \le 0.07$$

$$0.03 \le Y/(A+B) \le 0.12$$

$$0.05 \le Z/(A+B) \le 0.17$$

Figure 8:
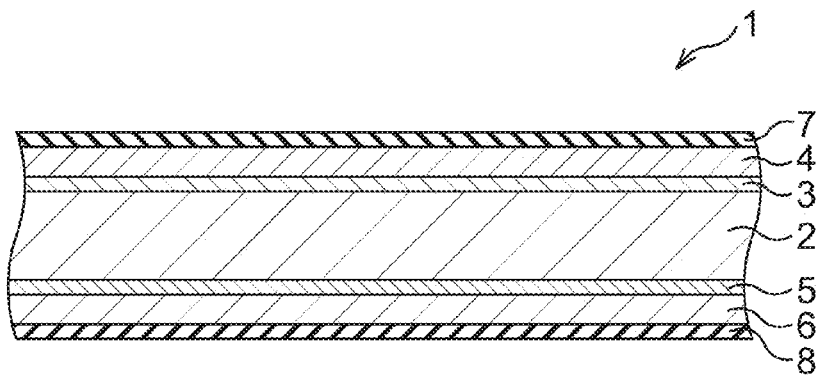
FIG. 8 is a cross-sectional view illustrating a structure of a plated steel sheet according to another modified example of the embodiment.

As illustrated in FIG. 8, the plated steel sheet 1 illustrated in FIG. 4 may include a chromate-free film 8 on the plating layer 6. Similarly, the plated steel sheet 1 illustrated in FIG. 5 or FIG. 6 may include a chromate-free film 8 on the plating layer 6 or the pre-plating layer 5. The chromate-free film 8 is preferably composed in the same manner as that of the chromate-free film 7.

EXAMPLE

Next, examples of the present invention will be explained, but conditions of the examples are condition examples employed for confirming the applicability and effects of the present invention, and the present invention is not limited to these condition examples. The present invention can employ various conditions as long as the object of the present invention is achieved without departing from the spirit of the present invention.

First, steels were each smelted by refining and a vacuum degassing treatment in a normal converter to obtain steel materials. Then, on each of the steel materials, hot rolling, cold rolling, and continuous annealing were performed under normal conditions, and thus ultralow carbon steel sheets each having a sheet thickness of 0.8 mm were manufactured.

Thereafter, a pre-plating layer of each of Zn, Sb, Sn, In, Cu, a Zn—Sb alloy, a Sn—Cu alloy, a Sn—Sb—In alloy, Co, Mn, Cr, and Ni was formed by electroplating on both surfaces of each of the ultralow carbon steel sheets. A solution containing each of the metals to be contained in the pre-plating layers as sulfate, chloride salt, nitrate, formate, or acetate was used in electroplating. A coating weight of the pre-plating layers was varied in a range of 0 g/m² to 6 g/m². The composition and the coating weight of the pre-plating layers are listed in Table 4.

Subsequently, a Zn—Ni alloy plating layer was formed on each of the pre-plating layers. A plating solution to be used for formation of the plating layer was produced in a manner that an aqueous solution containing zinc sulfate: 180 g/L, sodium sulfate: 100 g/L, and nickel sulfate was prepared and pH of the aqueous solution was adjusted to 1.2 with sulfuric acid. The amount of nickel sulfate was varied in a range of 0 g/L to 300 g/L. The Ni content of the Zn—Ni alloy was varied in a range of 0 mass % to 20 mass %, and the coating weight was varied in a range of 3 g/m² to 50 g/m². The Ni content and the coating weight of the plating layer are listed in Table 4.

Then, a chromate-free film was formed by a chromate-free treatment on each of the plating layers. The main component of a treatment solution used for the chromate-free treatment and the coating weight of the chromate-free film are listed in Table 4.

In this manner, various plated steel sheets were manufactured.

Thereafter, workability, resistance to degraded gasoline, and resistance to a composite fuel of gasoline and alcohol were examined for the plated steel sheets.

(Workability)

In the examination of workability, a forming test was performed using a cylindrical punch having diameter of 50 mm with a drawing ratio of 2.3 by a hydraulic forming tester. A blank holding pressure was set to 500 kg/cm². Then, the workability was evaluated based on the following standards.

◯: formable and no plating layer peeling x: formable and plating layer peeled (Resistance to Degraded Gasoline)

In the examination of the resistance to degraded gasoline, a cylindrical cup having a diameter of 100 mm was formed of the plated steel sheet, and a corrosive solution produced in the following manner was put into the inside of the cup to be sealed. In production of the corrosive solution, degraded gasoline was prepared by a method in conformity with JIS K 2287, and to this degraded gasoline, 10 vol % of water was added. The corrosive solution was two-phase separated into a gasoline phase and a water phase and was adjusted with use of a formic acid reagent and an acetic acid reagent so that the concentration of formic acid became 100 mg/L and the concentration of acetic acid became 200 mg/L in the water phase being the lower phase side. Thereafter, the cylindrical cup with the corrosive solution enclosed therein was left to stand at 45° C., and after 1000 hours elapsed, a corrosion depth of the cylindrical cup was measured. Then, the resistance was evaluated based on the following standards.

○: no corrosion

Δ: corrosion having a depth of 20 μm or less exists x: corrosion having a depth of greater than 20 μm exists (Resistance to a Composite Fuel)

In the examination of the resistance to a composite fuel, a cylindrical cup having a diameter of 100 mm was formed of the plated steel sheet, and a corrosive solution produced in the following manner was put into the inside of the cup to be sealed. In production of the corrosive solution, a composite fuel containing gasoline:ethanol:water=69:29:2 by volume ratio was prepared, and to this entire composite fuel, acetic acid: 100 mg/L and NaCl: 100 mg/L were added. Then, the cylindrical cup with the corrosive solution enclosed therein was left to stand at 45° C., and after 1000 hours elapsed, a corrosion depth of the cylindrical cup was measured. Then, the resistance was evaluated based on the following standards.

⊚: no corrosion

○: corrosion having a depth of less than 5 μm exists

Δ: corrosion having a depth of not less than 5 μm nor more than 20 μm exists x: corrosion having a depth of greater than 20 μm exists These evaluation results are listed in Table 4.

TABLE 4

| | SAMPLE No. | PRE-PLATING LAYER COMPOSITION | PRE-PLATING LAYER COATING AMOUNT (g/m²) | PLATING LAYER Ni CONTENT (MASS %) | PLATING LAYER COATING AMOUNT (g/m²) | CHROMATE-FREE TREATMENT MAIN COMPONENT | CHROMATE-FREE TREATMENT COATING AMOUNT (g/m²) |
|---|---|---|---|---|---|---|---|
| EXAMPLE | 1 | Zn | 0.5 | 5 | 5 | Zr | 10 |
| | 2 | Zn | 1.0 | 10 | 10 | Zr | 300 |
| | 3 | Zn | 2.0 | 15 | 15 | Zr | 600 |
| | 4 | Sb | 0.5 | 10 | 20 | Ti | 10 |
| | 5 | Sn | 1.0 | 15 | 20 | Ti | 300 |
| | 6 | In | 5.0 | 15 | 25 | Ti | 600 |
| | 7 | Cu | 1.2 | 15 | 20 | SILANE COUPLING AGENT | 10 |
| | 8 | 90 MASS % Zn-10 MASS % Sb | 1.5 | 10 | 30 | SILANE COUPLING AGENT | 300 |
| | 9 | 95 MASS % Sn-5 MASS % Cu | 1.0 | 5 | 20 | SILANE COUPLING AGENT | 600 |
| | 10 | 90 MASS % Sn-5 MASS % Sb-5 MASS % In | 6.0 | 10 | 60 | SILANE COUPLING AGENT | 50 |
| | 11 | Sn | 1.0 | 10 | 20 | Ti | 8 |
| | 12 | Sn | 1.0 | 10 | 20 | P | 300 |
| COMPARATIVE EXAMPLE | 13 | NONE | 0.0 | 10 | 20 | Zr | 300 |
| | 14 | Zn | 0.4 | 10 | 20 | Zr | 300 |
| | 15 | Sn | 0.2 | 10 | 20 | Zr | 300 |
| | 16 | Co | 1.0 | 10 | 20 | Zr | 300 |
| | 17 | Mn | 1.0 | 10 | 20 | Zr | 300 |
| | 18 | Cr | 1.0 | 10 | 20 | Zr | 300 |
| | 19 | Sn | 1.0 | 0 | 20 | Ti | 300 |
| | 20 | Sn | 1.0 | 4 | 20 | Ti | 300 |
| | 21 | Sn | 1.0 | 16 | 20 | Ti | 300 |
| | 22 | Sn | 1.0 | 10 | 4 | Ti | 300 |
| | 23 | Ni | 44.0 | 13 | 59 | Zr | 300 |
| | 24 | Ni | 1.0 | 10 | 20 | Zr | 300 |

| | SAMPLE No. | WORKABILITY | RESISTANCE TO DEGRADED GASOLINE | RESISTANCE TO COMPOSITE FUEL | REMARKS |
|---|---|---|---|---|---|
| EXAMPLE | 1 | ○ | ○ | ◎ | EXAMPLE |
| | 2 | ○ | ○ | ◎ | EXAMPLE |
| | 3 | ○ | ○ | ◎ | EXAMPLE |
| | 4 | ○ | ○ | ◎ | EXAMPLE |
| | 5 | ○ | ○ | ◎ | EXAMPLE |
| | 6 | ○ | ○ | ◎ | EXAMPLE |
| | 7 | ○ | ○ | ◎ | EXAMPLE |
| | 8 | ○ | ○ | ◎ | EXAMPLE |
| | 9 | ○ | ○ | ◎ | EXAMPLE |
| | 10 | ○ | ○ | ◎ | EXAMPLE |
| | 11 | ○ | ○ | ○ | EXAMPLE |
| | 12 | ○ | ○ | ○ | EXAMPLE |
| COMPARATIVE EXAMPLE | 13 | ○ | ○ | X | COMPARATIVE EXAMPLE |
| | 14 | ○ | ○ | X | COMPARATIVE EXAMPLE |
| | 15 | ○ | ○ | X | COMPARATIVE EXAMPLE |
| | 16 | ○ | ○ | X | COMPARATIVE EXAMPLE |
| | 17 | ○ | ○ | X | COMPARATIVE EXAMPLE |
| | 18 | ○ | ○ | X | COMPARATIVE EXAMPLE |
| | 19 | ○ | X | X | COMPARATIVE EXAMPLE |
| | 20 | ○ | Δ | Δ | COMPARATIVE EXAMPLE |
| | 21 | X | X | X | COMPARATIVE EXAMPLE |
| | 22 | ○ | Δ | Δ | COMPARATIVE EXAMPLE |
| | 23 | ○ | ○ | X | COMPARATIVE EXAMPLE |
| | 24 | ○ | ○ | X | COMPARATIVE EXAMPLE |

As listed in Table 4, in Examples No. 1 to No. 12 each falling within the present invention range, in terms of all of the workability, the resistance to the degraded gasoline, and the resistance to the composite fuel, good results were obtained. In Examples No. 1 to No. 10, a preferable chromate-free film was included, so that the resistance to the composite fuel was particularly excellent.

On the other hand, in Comparative examples No. 13 to No. 15, no pre-plating layer was formed or the coating weight of the pre-plating layer was small, so that sufficient resistance to the composite fuel could not be obtained. In Comparative examples No. 16 to No. 18, No. 23, and No. 24, the metal contained in the pre-plating layer was not appropriate, so that sufficient resistance to the composite fuel could not be obtained. In Comparative examples No. 19 and No. 20, the Ni content of the Zn—Ni alloy of the plating layer was low, so that sufficient resistance to the degraded gasoline and sufficient resistance to the composite fuel could not be obtained. In Comparative example No. 21, the Ni content of the Zn—Ni alloy of the plating layer was high, so that sufficient workability could not be obtained and peeling of the plating layer occurred. In association with this, sufficient resistance to the degraded gasoline and sufficient resistance to the composite fuel also could not be obtained. In Comparative example No. 22, the coating weight of the plating layer was small, so that sufficient resistance to the degraded gasoline and sufficient resistance to the composite fuel could not be obtained.

INDUSTRIAL APPLICABILITY

The present invention can be utilized in industries related to fuel tanks of an automobile, a motor cycle, and the like, for example.

The invention claimed is:

1. A plated steel sheet, comprising:
   a steel sheet;
   a pre-plating layer on at least one surface of the steel sheet; and
   a plating layer of a Zn—Ni alloy on the pre-plating layer, a Ni content of the Zn—Ni alloy being 5 mass % to 15 mass %, wherein
   the pre-plating layer consists of In, Sb, or Sn—Sb—In alloy, and 10 mass % or less of a total amount of Cr, Mo, Nb, Fe, Co, Mn, and Ni,
   a coating weight of the pre-plating layer is 0.5 g/m$^2$ or more, and
   a coating weight of the plating layer is 5 g/m$^2$ or more.

2. The plated steel sheet according to claim 1, further comprising a chromate-free film of 10 mg/m$^2$ or more on the plating layer.

3. The plated steel sheet according to claim 2, wherein the chromate-free film contains a fluoro compound of hexafluorotitanic acid or hexafluorozirconic acid or both of them, phosphoric acid, and a vanadium compound.

4. The plated steel sheet according to claim 2, wherein the chromate-free film is formed by using a treatment solution containing a salt of Zr or Ti or both of them, or a treatment solution containing a silane coupling agent.

5. The plated steel sheet according to claim 4, wherein the chromate-free film is formed by using the treatment solution containing a silane coupling agent and the silane coupling agent contains a first silane coupling agent containing a single amino group in a molecule and a second silane coupling agent containing a single glycidyl group in a molecule.

* * * * *